United States Patent

[11] 3,523,556

[72] Inventor Brian Stanley Worrall
Sutton Coldfield, England
[21] Appl. No. 730,364
[22] Filed May 20, 1968
[45] Patented Aug. 11, 1970
[73] Assignee Expert Industrial Controls Limited
Lount, Ashby-de-la-Zouch, England
a British company
[32] Priority June 2, 1967
[33] Great Britain
[31] 25,590/67

[54] FLUID CONTROL VALVES
10 Claims, 3 Drawing Figs.
[52] U.S. Cl. .................................................... 137/625.65,
251/129, 251/130, 251/333
[51] Int. Cl. ..................................................... F16k 11/07
F16k 31/02

[50] Field of Search............................................137/625.65,
625.64, 625.63; 251/129, 130, 139, 333

[56] References Cited
UNITED STATES PATENTS
3,092,145 6/1963 Brinkel........................ 137/625.65
3,324,889 6/1967 Batts ............................ 137/625.69
3,377,046 4/1968 Frantz et al................... 137/625.65XR Primary Examiner— Henry T. Klinksiek
Attorney—Holman, Glascock, Downing and Seebold ABSTRACT: A solenoid operated valve including a valve member which is urged into contact with a seating defined on an insert, by means of a coiled compression spring, there being provided an armature movable by a solenoid which reduces the force exerted by the spring and the valve member thereby permitting fluid pressure to effect opening of same.

Patented Aug. 11, 1970

3,523,556

INVENTOR
B. S. Worrall.
BY
ATTORNEYS

FLUID CONTROL VALVES

This invention relates to fluid pressure control valves and has for its object to provide such a valve in a simple and convenient form.

A fluid pressure control valve in accordance with the invention comprises in combination, a valve member for cooperation with a seating to prevent fluid flow through the valve, the pressure of the fluid acting upon said valve member in a direction to lift the valve member from said seating, resilient means acting to hold the valve member on the seating against the action of the pressure of fluid, and electro magnetic means operable to reduce the force exerted by the resilient means to permit the valve member to be lifted from the seating by the fluid pressure.

Figure 1:
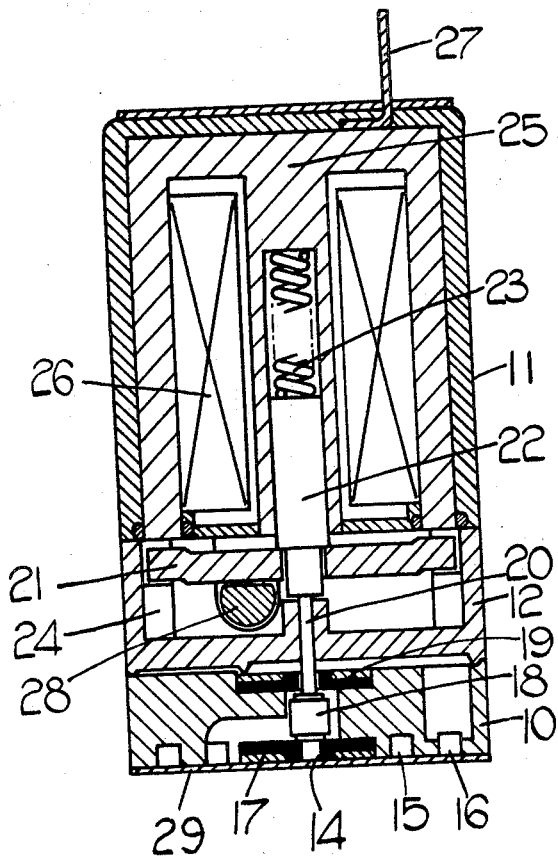
Figure 2:
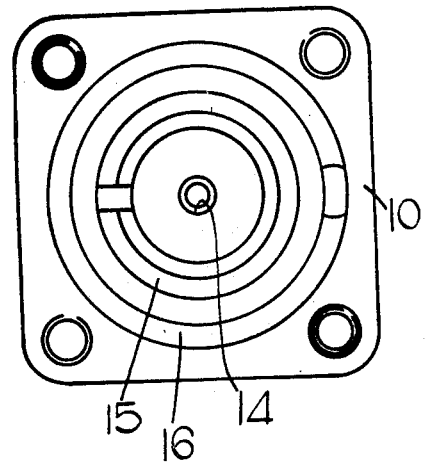
Figure 3:
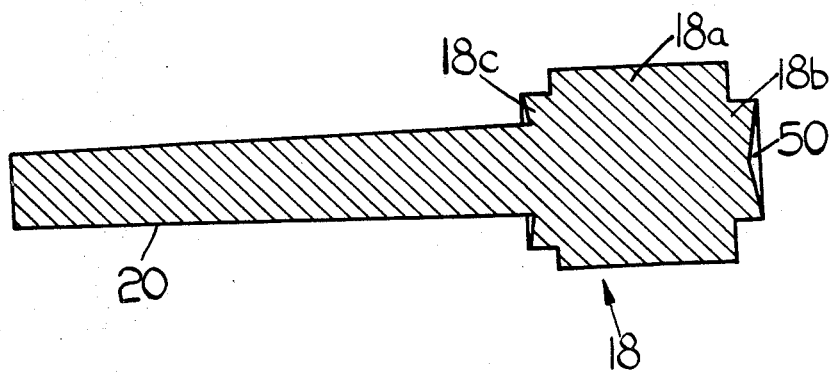

One example of a fluid pressure control valve is seen in the accompanying drawings in which:

FIGURE 1 is a sectional side elevation of the valve,
FIGURE 2 is an inverted plan view of the valve and
FIGURE 3 is a sectional view to an enlarged scale of part of the valve.

With reference to the drawings the valve comprises a valve housing 10 and a solenoid housing 11 between which is located an armature housing 12. The solenoid housing and the valve housing are secured relative to each other by a pair of bolts (not shown) extending through the solenoid housing and engaging within screw threaded apertures in the valve housing.

The valve housing 10 is of rectangular section with a flat outer end face which is provided with a central fluid inlet aperture 14, and inner and outer circular grooves 15 and 16 respectively. The inlet aperture is defined in an insert 17 which is located within a recess formed in the end face, the recess and insert being of circular shape. Moreover, the insert 17 comprises a metal plate which is exposed to the exterior of the housing and a resilient layer which constitutes a first seating for a valve closure member 18. The valve closure member is of stepped cylindrical form and is formed integrally with an actuating pin 20. The valve member 18 has a main body portion 18a and closure portions 18b and 18c of reduced diameter at its opposite ends respectively. The closure portion 18b is defined at the end of the body portion remote from the actuating pin 20 and its end face defines a conical recess 50 having an included angle of 160° approximately. The closure portion 18b co-operates with the resilient layer of the insert 17 the effect of the taper being to improve the action of the valve member as will be described. For the same purpose the end face of the closure portion 18c is similarly recessed. The diameter of the closure portion 18b is greater than the port 14.

The member 18 is axially movable within a central valve chamber formed in the valve housing 10 and this chamber is in communication with the inner circular groove 15. Moreover, the other end of the valve chamber is closed by a further insert 19 this being held in position within a complementary recess formed in the inner end face of the valve housing, by means of a rib defined on the adjacent face of the armature housing 12. This further insert 19 is formed in the same manner as the insert 17 and defines a second seating for the member 18. The two seatings are spaced by an amount sufficient to ensure that the valve member 18 can move as will be described.

Formed in the further insert 19 is an aperture through which extends with clearance, the actuating pin 20. In this example the pin is formed integrally with the member 18 but the two can be formed as two separate pieces. The clearance between the pin 20 and the wall of the aperture in the insert 19 through which it extends is in communication with the outer circular groove 16 and the diameter of the closure portion 18c is larger than the aforesaid aperture. In FIGURE 1 of the drawings a dust cover 29 is provided to exclude foreign material from the valve whilst it is being transported. The cover is removed when the valve is placed in service and FIGURE 2 shows the end of the valve with the cover removed.

The armature housing 12 is of generally rectangular U section and is located within a groove formed in the inner end face of the valve housing 10. Moreover, its face which is presented to the solenoid housing 11 is hollowed out to provide accommodation for an armature 21.

The armature 21 is slidable upon a cylindrical spring abutment 22 which is slidably accommodated within the solenoid housing 11. The abutment 22 is loaded in an outward direction by a coiled compression spring 23 and its outer end bears upon the actuating pin 20. This end of the abutment is smaller in diameter than the remaining portion thereof thereby to define a step against which the armature 21 bears. The movement of the spring abutment and the closure member 18 under the action of the spring 23 is limited by abutment of the closure portion 18b with the resilient layer of the insert 17. However, the movement of the armature in this direction is not limited in this manner. Instead the armature movement is limited by steps 24 defined in the armature housing. In this manner when the valve member 18 is moved to the position indicated in FIGURE 1 the inertia of the armature is absorbed by the steps 24 rather than the closure member.

The solenoid comprises a laminated core 25 having a pair of outer limbs and a central limb around which is mounted a winding 26 which is wound upon a former before assembly to the core. Two spaced laminations of the core 25 are displaced from the remainder of the core to provide grooves on the outer pole faces for shading windings. The core together with the winding are moulded in a body of synthetic resin and at the same time terminal pieces 27 which have previously been connected to the ends of the winding are incorporated in the body.

In use, with the valve member 18 in the position shown the inner and outer circular grooves 15 and 16 are in communication with each other so that if for example groove 15 is in communication with the cylinder of a fluid pressure operable piston cylinder combination and groove 16 is in communication with the atmosphere, then the pressure in the cylinder will be atmospheric. Furthermore, the member 18 will be held upon the seating by the action of the spring 23 against the action of the fluid pressure applied at the port 14.

When the solenoid is energised the armature 21 is moved against the action of the spring thus reducing to zero the force exerted by the spring upon the valve member. As a result the fluid pressure acting on the valve member moves the latter off the seating of the insert 17 onto the seating of the insert 19. The effect of this is that fluid under pressure is supplied to the cylinder of the piston cylinder combination. Upon de-energisation of the solenoid the spring moves the valve member to the position shown and the cylinder is exhausted of fluid.

It will be appreciated that various modifications may be made to the valve without departing from the invention. For instance the inserts 17 and 19 may be formed in one piece from a synthetic resin material. Moreover, other means apart from bolts may be provided to secure the housings relative to each other.

The effect of the resilient lining on the inserts together with the conical recesses in the end faces of the closure member is to improve the action of the valve member. The explanation for this is as follows: considering the closure portion 18b and the resilient lining surrounding the end of the port 14. In the fully closed position of the valve member the area of the valve member exposed to the pressure of fluid in the port 14 is approximately equal to the area of the port. However, as the valve member moves away from the lining this area increases before the port is opened with the result that an increasing opening force is applied to the closure member so that the closure member "snaps" to the open position. During closing of the valve the area progressively reduces and again "snap" closing of the valve member results.

The example shown is provided with a manually operable actuator 28 which can be moved angularly to effect movement of the armature 21 and the spring abutment 22 against the action of the spring 23. This is an optional feature.

I claim:

1. A fluid pressure control valve comprising in combination, a movable valve member, a seating with which said valve member can cooperate to prevent fluid flow through the valve, the pressure of the fluid acting upon said valve member in a direction to lift the valve member from said seating, resilient means acting to hold the valve member on the seating against the action of the pressure of liquid, and electromagnetic means operable to reduce the force exerted by the resilient means to permit the valve member to be lifted from the seating by the fluid pressure, said valve member defining a conical recess in its face presented to the seating and the seating being formed of resilient material whereby in the closed position of the valve member a small area thereof is exposed to the fluid pressure said area increasing as the valve member moves away from the seating and decreasing as the valve member moves from an open position towards the seating thereby to produce rapid opening and closing of the valve.

2. A fluid pressure control valve as claimed in claim 1 in which said electromagnetic means comprises an armature movable by the magnetic field produced by a solenoid to effect a reduction in the force exerted by the resilient means on the valve member.

3. A fluid pressure control valve as claimed in Claim 2 in which the resilient means comprises a coiled compression spring, the force exerted by the spring on the valve member being transmitted through a spring abutment.

4. A fluid pressure control valve as claimed in Claim 3 in which the abutment is of stepped form and the armature is slidably mounted about the narrower portion of the abutment, the armature engaging the step defined on the abutment during its movement under the action of the solenoid thereby to effect compression of the spring.

5. A fluid pressure control valve as claimed in Claim 4 in which the permitted return movement of the armature is greater than that of the valve member whereby the inertia gained by the armature during its return movement is not absorbed by the valve member.

6. A fluid pressure control valve as claimed in Claim 5 including steps to limit the extent of movement of the armature.

7. A fluid pressure control valve as claimed in Claim 6 including a valve housing a solenoid housing, means securing said housings relative to each other, and an armature housing located within a groove formed in the face of the valve housing which is presented to the solenoid housing.

8. A fluid pressure control valve as claimed in Claim 7 in which the valve member is provided with an integral actuating pin which is contacted by said abutment, said actuating pin passing through an aperture defined in the valve housing.

9. A fluid pressure control valve as claimed in Claim 8 including a second valve seating defined about said aperture, the end of said valve member about said pin being recessed for co-operation with said second seating.

10. A fluid pressure control valve as claimed in Claim 9 including manually operable means for moving said armature against the action of said spring.